(12) United States Patent
Adamson et al.

(10) Patent No.: US 8,439,090 B2
(45) Date of Patent: May 14, 2013

(54) TYRE EQUIPPED FOR ATTACHING AN OBJECT TO THE WALL THEREOF AND FASTENER THEREFOR

(75) Inventors: John David Adamson, Greenville, SC (US); Claudio Battocchio, Riom (FR); Martine Borot, Cebazat (FR)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 463 days.

(21) Appl. No.: 12/670,157

(22) PCT Filed: Jul. 21, 2008

(86) PCT No.: PCT/EP2008/059523
§ 371 (c)(1),
(2), (4) Date: Jun. 21, 2010

(87) PCT Pub. No.: WO2009/013267
PCT Pub. Date: Jan. 29, 2009

(65) Prior Publication Data
US 2010/0276048 A1 Nov. 4, 2010

(30) Foreign Application Priority Data
Jul. 24, 2007 (FR) ...................... 07 05384

(51) Int. Cl.
*B60C 19/00* (2006.01)
*B60C 23/00* (2006.01)

(52) U.S. Cl.
USPC ........................................ 152/152.1; 152/450

(58) Field of Classification Search ................ 152/152.1, 152/450
See application file for complete search history.

(56) References Cited

U.S. PATENT DOCUMENTS

| 3,260,294 A | 7/1966 | Campion ....................... 152/176 |
| 5,824,397 A | 10/1998 | Koops et al. ................... 428/207 |

(Continued)

FOREIGN PATENT DOCUMENTS

| EP | 1 070 580 A2 | 1/2001 |
| FR | 1.188.714 | 9/1959 |

(Continued)

OTHER PUBLICATIONS

Machine translation of JP 2007-24696, 2007.*

*Primary Examiner* — Justin Fischer
(74) *Attorney, Agent, or Firm* — Fitzpatrick, Cella, Harper & Scinto

(57) ABSTRACT

A tire is described that includes a casing designed to be inflated to a service pressure and equipped to accept a functional object, such as an electronic circuit, for example, by means of a two-part fastener 10, such as a touch-close fastener, for example. A first part of the fastener is attached to a wall of the casing, while the second part can be joined to the first part when placed in contact with the first part to attach and keep the object on the casing when the tire is in service. The first part of the fastener includes a thin backing fixed to the wall of the casing and possessing a structural elongation capacity greater than or equal to that of the wall to which the thin backing is fixed. The presence of the thin backing does not significantly hinder the elongation of the wall of the casing when subjected to the stresses encountered during use of the tire and, where relevant, during its manufacture. Connection elements between the first and second parts give these parts a certain looseness with respect to each other so that the object held by the second part of the fastener is not subjected to all or some of the stresses occurring in the wall during operation.

15 Claims, 2 Drawing Sheets

U.S. PATENT DOCUMENTS

| | | | |
|---|---|---|---|
| 6,164,994 A * | 12/2000 | Bolen et al. | 439/164 |
| 6,524,415 B1 | 2/2003 | Youngman et al. | 156/123 |
| 6,585,130 B2 * | 7/2003 | Turbett et al. | 221/45 |
| 6,729,797 B2 * | 5/2004 | Manger et al. | 405/52 |
| 7,112,153 B1 * | 9/2006 | Beu | 473/553 |
| 7,222,523 B1 * | 5/2007 | Huang et al. | 73/146 |
| 2005/0076992 A1 | 4/2005 | Metcalf et al. | 156/110.1 |

FOREIGN PATENT DOCUMENTS

| | | | |
|---|---|---|---|
| JP | 5-088309 U | | 12/1993 |
| JP | 2002-209611 A | | 7/2002 |
| JP | 2006-044503 A | | 2/2006 |
| JP | 2007-24696 | * | 2/2007 |
| WO | WO 03/070496 A1 | | 8/2003 |
| WO | WO 2006/012942 A1 | | 2/2006 |

* cited by examiner

TYRE EQUIPPED FOR ATTACHING AN OBJECT TO THE WALL THEREOF AND FASTENER THEREFOR

FIELD OF THE INVENTION

The present invention relates to tyres for vehicle wheels. It deals particularly with the attachment to tyres of associated functional objects. Such objects may be sensors, identification circuits, and/or units for communicating with the environment around the tyre, monitoring its operation and changes in its physical properties, or giving warnings, all more or less elaborate functions designed to offer so-called smart tyres to the market.

BACKGROUND

One of the main problems to be solved is how to install and keep objects in position in the tyre during sometimes very long periods, which may even be the entire service life of the tyre, with no deterioration in the physical and functional integrity of the tyre and of these objects in what is a highly stressful environment, whether the vehicle to which the equipped tyre is fitted is travelling or at rest.

To avoid having to install an electronic circuit during the manufacture of the tyre and thus subject it to the stresses associated with the shaping of the green tyre and its curing, the proposal has already been made, in document EP 1 070 580 for example, to install on the inner wall of the casing prior to curing an adhesive strip protected by a film of nonstick material. After curing, this film is removed and one face of the package of an electronic circuit is attached to the exposed adhesive strip. The strip allows the package to be at a distance from the wall of the tyre and its flexibility means that it can withstand shear forces during the deformation of the tyre in operation.

Document WO 03/070496 provides another approach in which the inside wall of the tyre is covered before curing with a strip of material whose surface is provided with loops, forming one piece of a touch-close fastener of the hook-and-loop type. The other piece of this fastener is provided with hooks which are capable of engaging in the loops of the first piece when the two pieces are brought together, after the tyre is cured and before it is fitted to a wheel rim. The object to be installed inside the tyre cavity is attached to the non-hook face of this second piece. In a variant of the aforementioned document, the object may be sandwiched between the faces covered with loops and hooks of these two pieces in order to keep it in the selected position on the inside wall. This arrangement, which uses a technique that has long been known for the removable attachment of an object to a tyre, for example from U.S. Pat. No. 3,260,294, has the advantage that the object can be removed at any time when the tyre is taken off the wheel, either to replace it or to reuse it at the end of the tyre's life, or to use certain data relating to it.

However, both the above solutions have the drawback that the first piece of the adhesive or touch-close fastener, integrated into the wall of the tyre during manufacture, by definition hinders the deformation of this wall when subjected to the stresses which it experiences in two cases. The first case is the manufacture of the tyre, particularly when its manufacture involves one or more steps requiring shaping of the casing. The second case is when the tyre is rolling in use, because of course the wall of the casing deforms cyclically with each revolution of the wheel. Furthermore, it is subjected to sometimes substantial deformations as it absorbs all the loads and shocks consequent upon the movement of the wheel over uneven road surfaces, sometimes strewn with obstacles such as potholes, stones, kerbs and so forth.

BRIEF DESCRIPTION OF THE INVENTION

With these difficulties in view, the invention aims to enable an object to be attached inside a tyre using a two-part fastener, in which one part is fixed to the wall of the tyre in such a way as to interfere as little as possible with the tyre intended to receive it, during operation and where relevant during manufacture.

In accordance with this aim, a tyre in one aspect of the invention comprises an casing whose wall is suitable for containing an internal service pressure after the casing has been mounted on a vehicle wheel, and a touch-close fastener for attaching an object to this wall, this fastener comprising a first part fixed to the wall and capable of deforming with the wall, and a second part suitable for joining mechanically with the first part by connection elements when the second part is placed against it, in such a way as to hold the object in its service position on the wall of the tyre. The tyre is characterized in that:

the property of inherent deformability of the first fastener part is such that the stresses developed in this fastener by the deformations which it undergoes on contact with the wall are substantially less than the stresses which produce said deformations in the wall of the casing, in such a way that the presence of this first fastener part does not significantly hinder the deformations of the wall, and in that in the joined position the connection elements leave (or provide) a mechanical looseness between the first and second fastener parts that limits the transmission of the stresses to the second part of the fastener and to the object in its service position.

With these provisions the object can be attached, removably or nonremovably, to a position on the inside or outside of the wall which has been previously prepared for this purpose, before it is mounted on a wheel rim if the object is attached inside the tyre cavity.

The proposed fastener system protects the sector of the casing wall to which the object is attached by allowing it in particular to deform in its normal operational mode, and in particular to stretch, without excessive stress or fatigue. In particular, when the wall of the tyre is stressed in tension at the location where the fastener is attached, it stretches and transmits to its interface with the fastener shear forces which stretch the latter and accompany its return to the initial state when the tensile stress is removed. In this aspect of the invention the characteristics of deformability of the fastener are such that the deformations of elongation and contraction imposed by the tyre wall (due to sometimes high stresses in the casing) cause in reaction only low stresses in this wall. Additionally, this effect is obtained without affecting the strength of the attachment of the object because the deformations of the first part of the fastener are essentially absorbed by the connection between the two parts. The quality of the attachment between the connection elements is maintained throughout the duration of use and the object itself is, at least for the most part, protected from the mechanical stresses affecting the wall to which it is attached.

The connection between the first and second parts can advantageously be made in the same way as in known touch-close mechanical systems. The connection elements include filamentary or thread-like elements or flexible pins connecting one face of the thin backing to a corresponding face on the second fastener part. The physical or geometrical characteristics of these elements, particularly their length, their inclination with respect to the surfaces of the fastener parts to which they belong, their distribution, and their density are determined in such a way as to give the connection a capacity for tangential and/or radial looseness between the faces which is appropriate for preventing or attenuating the transmission to the attached object of the deformations affecting the first part of the fastener due to the elongation, shearing and twisting occurring in a rolling tyre.

In one embodiment, each of the first and second fastener parts is provided with connection elements suitable for latching onto connection elements on the other part when the corresponding faces of these two parts are pressed or brought together. These connection elements may include, in a known manner, male coupling elements such as hooks, barbs or mushrooms projecting from the surface of one of the fastener parts, and female coupling elements, such as loops or receptacles, fixed in the corresponding face of the other fastener part. In a preferred embodiment, the connection elements on the first fastener part are loops of adjustable length and/or inclination protruding in one or more transverse directions with respect to the surface of the casing wall.

In one embodiment, the first part of the fastener includes a thin backing fixed to the wall of the casing and having a structural elongation capacity greater than or equal to the maximum amplitude of the deformation of the casing to which it is fixed when subjected to the stresses which may be applied to it.

The thin backing may include a ply, fabric or cloth, woven or nonwoven or made using a knitted structure or chainmail structure or made in some other way. The threads or filaments of this structure form a substrate to which are attached flexible connection elements which project from one of the faces of the backing, while its other face is designed to be attached to the chosen location in the wall of the tyre casing. Alternatively the surface of the backing may contain gaps or receptacles forming entrances to cavities into which may be inserted the ends of male connection elements in the form of hooks, barbs or mushrooms extending from the second part of the touch-close fastener so that the two latch together.

The thread elements which form the cloth of the thin backing may be elastic in order to give the thin backing the required properties of deformability with the wall to which the first fastener part is connected. They may also be assembled in a loose structure, for example like that of a knitted fabric or crochet work, which gives them considerable stretchability with or without elastic deformation. In this regard, a chainmail-type structure consisting of rings which may or may not be flexible attached together in two dimensions to form a ply, is also very suitable for the requirements. In all these cases, the backing made in this way can be coated on one side with at least one substance, such as a rubbery substance, giving the ply the ability to return elastically to its initial shape if needed.

In most tyre applications the structural elongation capacity of the thin backing of the first touch-close fastener part must be at least 10% to absorb the cyclical deformations of the tyre wall during use of the casing as it rolls along; it is preferably at least 30%, in order to absorb adequately the substantial deformations of the casing encountered by the tyre when in use as indicated earlier, and especially to absorb the foreseeable accidental deformation of the wall of the tyre when it contacts obstacles encountered as the tyre rolls along.

In one embodiment it may be advantageous to make the first part integral with the wall of the tyre in the course of its manufacture, for example on the side internal to the cavity. In this case the initial structural elongation capacity of the thin backing before completion of manufacture (the vulcanizing step in particular) must permit the deformations, especially the permanent elongations, that are inherent in the stage or various stages of shaping of the unfinished green tyre in its manufacture (and during its vulcanization, where relevant). Where the shaping work is considerable, it may be preferred to select for the thin backing a material possessing an initial structural elongation capacity—that is its capacity prior to the final consolidation and stabilisation operation(s) such as vulcanization—of at least 20% and even as much as 100% in order to reproduce the elongations of the wall throughout its manufacture.

In all cases, the property of deformability of the material of the thin backing (for example, its modulus of elasticity) must be sufficiently low so that this backing does not present a strong resistance, during operation, to the elongation forces transmitted to it by the wall of the tyre to which it is attached and so does not significantly hinder, at their interface, the deformation of the wall caused by the stresses which it experiences during use. It is thus possible to select for the thin backing a flexible material whose modulus of elasticity in the main direction of the deformations of the wall of the casing is less than 3.5 MPa at room temperature (23° C.), and 2.5 MPa at 60° C.

In accordance with an implementing aspect of the invention, it is possible to use a fastener whose first part includes connection elements implanted directly in the wall of the tyre and projecting out of this wall in the sector in question. In this way the ends of the connection elements implanted in the wall are free to move away from or towards each other as the wall deforms without restricting it in any way. The physical and/or geometrical properties of the flexible threads forming these elements, especially their length, are chosen to suit the mechanical decoupling action required to keep the object in the selected location while protecting it from the stresses which affect the wall of the tyre under the highly stressful environmental conditions which occur when the tyre is rolling, in such a way as to satisfy as far as possible the conditions of durability required for the application.

The invention also relates to a touch-close fastener for attaching an object inside a tyre, characterized in that it provides mechanical decoupling between a first part of the fastener, designed to be fixed to the wall of the tyre, and a second part, which can be applied to the first part in order to keep the object against the wall of the tyre in a service position.

The invention relates likewise to a green tyre in the course of manufacture comprising a thin backing possessing the aforementioned characteristics of deformability, connected to the green components of the tyre wall in order to form, at the end of the manufacturing process, a first touch-close attachment part fixed to this wall.

Other features and advantages of the invention will be found in the description given below with reference to the attached drawings, which show non-restrictive examples of embodiments of the subject of the invention.

BRIEF DESCRIPTION OF THE FIGURES

FIG. 2b is a cross section on plane A as marked in FIG. 2a.

FIG. 3b is a cross section on plane B as marked in FIG. 3a.

DETAILED DESCRIPTION OF EMBODIMENTS OF THE INVENTION

Figure 1:
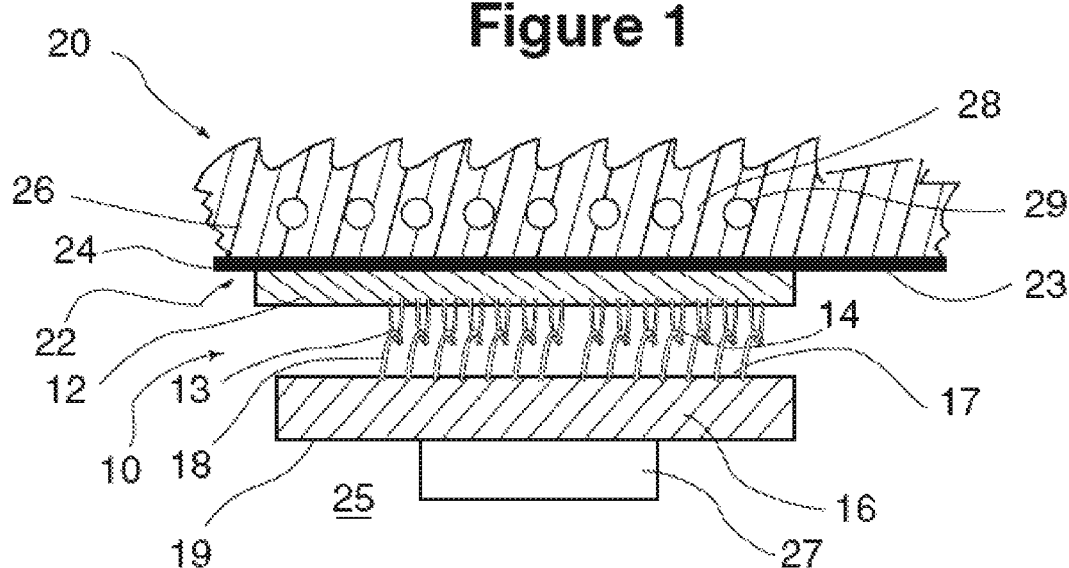
FIG. 1 shows in highly diagrammatic form an example of an embodiment of a wall of a tyre equipped according to the invention with a touch-close fastener.

In FIG. 1, a touch-close fastener 10 is attached to an inside face 23 of the wall 22 of a tyre casing 20. In this example of a tubeless tyre, this wall defines an inflatable cavity. It is coated with a rubber innerliner 24 to optimize its ability to contain the inflation gas. The rubber innerliner 24 is deposited on one or more layers of rubber 26 behind which is a carcass ply 28 whose reinforcing cables 29 can be seen in cross section.

The fastener 10 is a touch-close attachment made up of two parts. A first part comprises a thin flexible backing, which in this case is in the form of a strip 12 of an industrial knitted or woven fabric possessing a predetermined capability of elastic elongation in the directions of its plane, as will be explained later. One face of this strip 12 is in this case fixed to the rubber innerliner 24. Fixed into the opposite face 14 of this strip are female fastening elements such as strong loops 13 made of flexible aramid, polyamide, polyester or other thread. The loops 13 which form a sort of fur on the surface of the strip 12 extend inwards into the cavity 25 of the tyre 20 to allow male fastening elements such as hooks to attach to them, as explained below.

The second part of the fastener 10 is formed by another thin backing or mounting 16 as shown in highly diagrammatic form in FIG. 1 joined to the strip 12 of the first part. One face 17 of the mounting 16, which is turned towards the inside wall 22 of the tyre, is provided with male fastening elements such as hooks 18 which project out from the face 17 of the mounting 16 and at least a certain number of which are, in the joined position illustrated, engaged in corresponding loops 13 in the fur on the face 14 of the looped strip 12. A functional object, such as an electronic circuit 27 encapsulated in a protective material, is attached to the other face 19 of the hooked mounting, which is that facing the interior of the cavity 25 of the tyre. This circuit may perform one or more smart tyre functions, namely first of all a communication function, which may be active or passive in response to an electrical, magnetic or electromagnetic stimulus. It may also perform measurement functions in the environment, such as temperature and pressure, or more operational measurements to do with the stresses on the tyre, dynamic parameters such as accelerations. Lastly, although this list is not exhaustive, it may perform monitoring or warning functions.

The hooks 18 are made in this case of steel and are implanted in an aramid fabric or knitted structure forming the mounting 16, these materials being able to withstand in the required manner the stressful environment of the tyre cavity, both in terms of pressure and temperature, and to do so during periods which may extend to several years.

The strip 12 supporting the loops 13, and forming the thin backing of the first part of the fastener 10 has undergone a coating treatment to give it a green adhesive (tack) which will keep it in a fixed position on the wall 22 throughout the manufacture of the tyre and suitable adhesion after curing. In accordance with a provision which is significant to the implementation of the invention, the strip 12 is capable of deforming parallel to its plane and in particular of stretching at the same time as the wall of the tyre to which it is affixed without significantly resisting the elongations of this wall when the tyre is in use.

It is known that, as the wheel rotates, any given area of the wall 22 of the tyre deforms cyclically, from the moment when the corresponding sector of the tread enters the patch of the tyre which contacts the surface on which it is rolling, to the moment when it leaves it, and also, to a lesser extent, throughout the rest of the circular path of this area around the wheel axis, until the corresponding sector of the tread once again enters the contact patch. Furthermore, the wall 22 also experiences impacts transmitted by the unevenness of the road surface, in contact with which the wheel is moving. In particular, this occurs when it meets large obstacles such as humps, stones, potholes, various kerbs, etc. All these stresses produce tensile, bending, compressive, shear and twisting stresses in the wall of the tyre, which are transmitted to the connecting interface between it and the strip attached to it. It would seem desirable to ensure that the presence of the strip 12 does not hinder or restrict the capacity for deformation of the portion of the wall 22 of the tyre at the interface, since this could give rise to more intense localized stresses in sectors of the wall close to this interface, which could then suffer excessive fatigue or even break.

In one aspect of the invention, the thin backing is made with a strip 12 whose structural elongation capacity is greater than or equal to that of the wall of the tyre casing in the sectors in question. In practice, the material selected for this strip 12 has a structural elongation capacity of at least 10%, and preferably at least 30% to allow for the conditions of use of certain types of tyre (civil engineering, for example), or if it is wished to provide a sufficient safety margin in the case of very bad road surfaces. It is also helpful to use a thin backing whose modulus of elasticity, or elastic modulus, in the direction of the forces transmitted by the tyre wall is such that the forces generated in the thin backing in reaction to the deformations imposed on it at its interface with the casing wall are low compared with the forces causing them in this casing wall. By way of example, values for the tensile modulus of elasticity at 10% of deformation may be 3.5 MPa at room temperature (23° C.), and 2.5 MPa at 60° C. This provision allows in particular the wall of the tyre casing to deform when the tyre is in use without the risk of being restricted substantially by the strip 12 at the interface.

The fabric or cloth forming the thin backing for the loops of the strip may be made by weaving, knitting or other technique for interlacing fibres of materials suitable for the severely fatiguing conditions found in a tyre and for the required elasticity characteristics. Structures knitted from flexible threads can make very good structures possessing a high elongation capacity provided by the deformation of the loops. On this subject, the reader may refer to the teaching of the document in the name of the present applicants WO 2006/012942 A1 published on 9 Feb. 2006. Advantage can also be taken of the properties of chainmail-type structures as explained earlier.

One method for attaching the first part 12 of the fastener 10 to the wall of the tyre involves laying the strip 12 on a laying-up drum before laying the innerliner and the carcass ply 28 in the course of assembling the green components of the tyre. Once the components are assembled, or in some cases in an intermediate stage, the unfinished green tyre may be put through one or more operations which each involve shaping the assembly to arrive at the well-known toroidal shape. The unfinished green tyre is then placed in a mould in a vulcanizing press where it is subjected simultaneously to a suitable temperature and suitable pressure to bring about the vulcanization reaction of the rubbers which gives them their elasticity and strength qualities of cured rubber. This application of pressure is frequently accompanied by an additional shaping operation in which the rubbers are pressed into relief elements suitable for forming motifs (tread blocks and markings in particular) on the surface of the tyre casing and giving the green tyre its final profile.

In a multi-shaping tyre manufacturing process such as that described above, the strip 12 attached to the rubber innerliner which limits the cavity of the tyre experiences all the stresses produced by the deformations of this rubber. It is important that it offers only slight resistance to these deformations and that the position of its interface with this rubber is preserved throughout the manufacturing operations in order not to risk weakening the efficiency of the attachment of the strip to the intended location in the wall of the tyre. This may prompt the engineer to select a high structural elongation capacity in the green state for the material of the strip, for example up to 100% in the case in which the process involves several successive deformation steps before arriving at the definitive shape of the product. If on the other hand the tyre manufacturing process does not involve the multiple and severe shaping steps in manufacture, a strip with a lesser structural elongation capacity in the green state may be sufficient.

The strip 12 on which the loops are mounted may also be attached to the tyre casing in the course of manufacture immediately before vulcanization, for example in a curing press equipped with a bladder which is pressed in against the inside of the wall of this casing. In this case a very high structural elongation capacity in the green state of the strip is not necessary. Of course, the material of which the loops are made is able to withstand the pressure and temperature of the bladder during vulcanization so that they either acquire or do not lose, by the end of the operation, the mechanical characteristics necessary for latching onto the connection elements of the second fastener part 10.

Figure 2A:
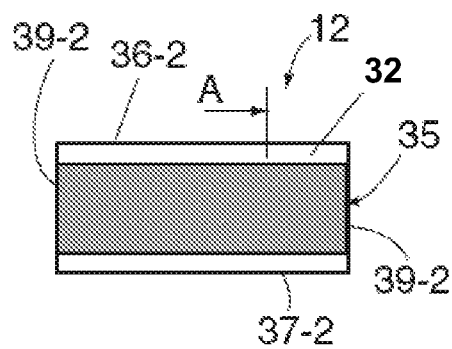
FIG. 2a is a plan view of an embodiment of the looped part of such a fastener based on the products currently available.
Figure 2B:
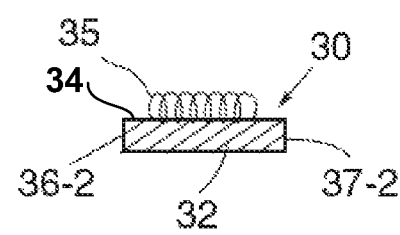

FIG. 2a shows a strip 12 made from a fastener backing in accordance with currently commercially available products. This strip is made by cutting the appropriate length from a tape 30 which has a thin backing 32 (of the material formed by a fabric or other textile coated with plant-based or synthetic technical thread), covered on one of its faces 34 with fur-like loops of thread 35 of aramid or other material as stated earlier. As can be observed in the cross section shown in FIG. 2b, the fur-less longitudinal edges 36-2 and 37-2 of the face 34 are smooth and made relatively stiff by the coating of the fibres of the backing or back 32, which makes these edges abrasive or sharp and could risk damaging the surrounding rubber. The transverse ends 39-2 of the strip 12, which are the result of cutting the tape 30, do not have a smooth edge. They do however also have the drawback of being abrasive and could therefore, over time, cut the rubber to which they are bonded.

Figure 3A:
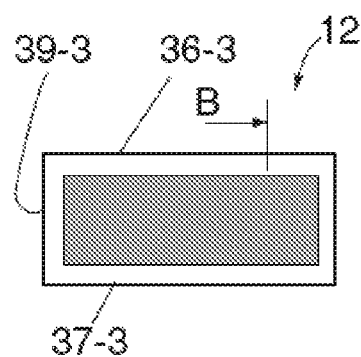
FIG. 3a shows a preferred variant of the piece seen in FIG. 2a for carrying out the invention is the selected example.
Figure 3B:
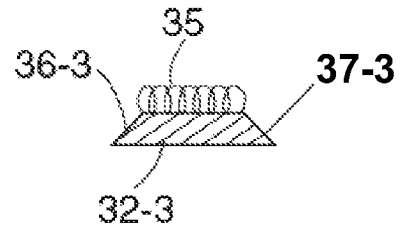

FIG. 3a shows the strip in an embodiment which reduces these difficulties because the transverse end edges 39-3 of the strip have no fur, so as to leave a smooth border all the way around the strip 12. Furthermore, the profiles of the edges 36-3, 37-3 and 39-3 are bevelled so that they tail off on contact with the underlying rubber all the way around the strip 12, in such a way that the flexibility of these edges is least in the area of the strip containing the loops and increases towards its periphery.

Thus, when the casing of the tyre has been provided during the manufacturing process with a first touch-close fastener part as stated above, all that is required is, either before dispatching the tyre from the place of manufacture, or when mounting it on a wheel rim, to attach to it the desired functional object as appropriate for the intended applications of this tyre. The mounting 16 of the second fastener part 10, with its circuit 27, is attached by applying and pressing it directly to the first part to cause the hooks or barbs 18 on the second part to engage in the loops 13 of the thin backing 12 of the first part. This operation can be done by hand or mechanically, especially, in the latter case, if a high application pressure or a suitably controlled pressure is required for this purpose, for example when using relatively stiff latching elements. By way of indication, it has been found that the resistance to the forces to which the object is subjected can be up to 10 N/cm$^2$. This guideline offers a good safety margin over the separating forces experienced in operation (notably from centrifugal force) by the object and the second part of the touch-close fastener, either at right angles to the wall of the tyre or in shear, depending on the location on the wall where the fastener is positioned.

In this respect, the attachment described herein can be made directly in the crown of the wall of the tyre, underneath the tread, in which case centrifugal force acts compressively, bringing the two parts 12 and 16 of the fastener 10 towards each other. Other stresses which may be large in shear or in separation result from cyclical forces experienced by the crown of the tyre during rolling and from stresses transmitted by irregularities in the road surface and impacts with obstacles, as explained earlier. The object 27 may also be attached in the sidewall of the tyre, on the outside or more frequently on the inside. In this position the fastener has to withstand shear forces resulting from centrifugal force and other stresses which develop in the wall of the tyre. Lastly, the object can be located in or near the bead region.

Ordinary industrial touch-close fasteners grip very strongly and generally offer very little mechanical play between the two parts of the fastener. Forces affecting the casing are thus transmitted almost unchanged to the object. If no precautions were taken, the stiffness of the object might prevent the thin backing 12 of the first part of the fastener from deforming and therefore restrict the ability of the casing wall to which it is fastened to deform, which would be contrary to the aim set out above. The object itself should withstand a large part of the shear forces which are transmitted by the wall to the interface with the fastener, and the construction and encapsulation of the object should allow for these. In accordance with one advantageous feature of the invention, it was realized that the first part of the fastener could be mechanically decoupled from the second by varying certain features such as the length and flexibility of the connection elements between these two parts, or even, if desired, their elastic properties themselves. It is possible by these means to both adequately protect the wall of the casing at the interface and safeguard the object 27 against the transmission of the forces acting within this wall.

Figure 4A:
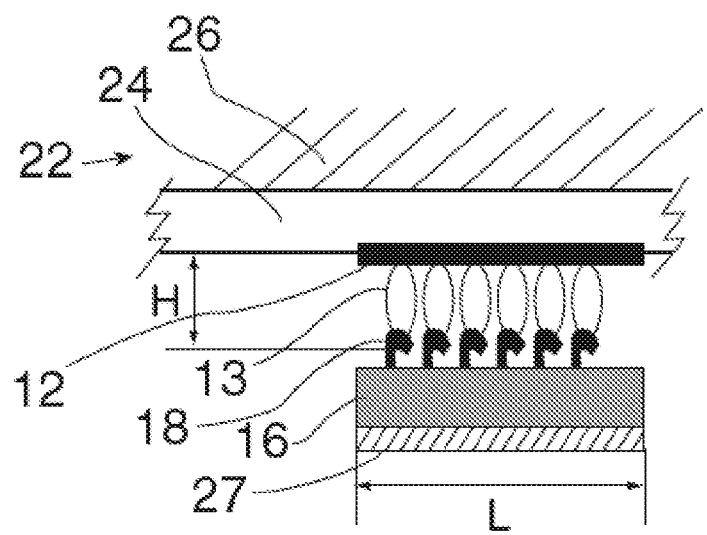
FIGS. 4A and 4B illustrate a mechanism of operation of the invention when the wall of the tyre undergoes deformations during use.
Figure 4B:
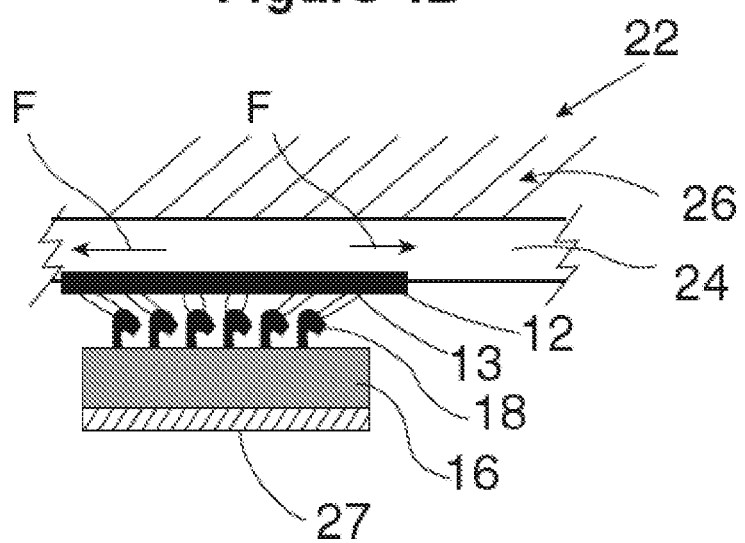

FIGS. 4A and 4B illustrate this decoupling mechanism by means of a cross section through the wall of the casing in a plane parallel to a main direction of deformation of this wall. The loops 13 of the fastener 10 have one end held in the backing strip 12 attached to the wall 22. At their other ends they are engaged by the hooks 18 fixed to the mounting 16 carrying the object 27, whose length in the main direction of deformation mentioned above is denoted L. In FIG. 4A, the wall 22 of the tyre coated with the rubber innerliner 24 is in static equilibrium at a given instant between the inflation pressure and the reaction forces developed by the tyre casing due to its structure. The loops 13 have a height H sufficient to create between the strip 12 and the mounting 16 a radial and tangential play (looseness) which is shown deliberately exaggerated in FIG. 4A.

FIG. 4B shows the situation during rolling when the wall 22 experiences a stress for one of the reasons mentioned earlier, which results in an elongation, illustrated by the arrows F, transmitted to the strip, which also stretches without significant resistance for the reasons explained previously. As shown diagrammatically in FIG. 4B, the feet of the loops implanted at this location move apart. Since they have sufficient height, the mutual separation of the feet is compensated for by the inclination of the loops and a corresponding reduction of the distance between the strip 12 and the mounting 16, so that the tensile forces affecting the strip 12 are not transmitted through the hooks 18 to the mounting 16 or to the object 27.

The aims set out above can therefore be achieved by adjusting the height of the loops (the length of the hooks could also be modified) to suit the length of the mounting 16 carrying the object 27. For example, with a mounting of length L equal to 50 millimeters and a loop height H of 5 millimeters, the wall of the tyre can thus undergo an elongation of 10% without the mounting 16 being affected, with a 30° inclination of the endmost loops of the strip 12. Techniques for manufacturing backings with connection elements for touch-close fasteners are described for example in patent FR 1 188 714 filed on 16 Dec. 1957.

Depending on its type of construction, the attachment provided by the touch-close fastener can be reversible. The functional object can therefore be recovered after being installed, either after a relatively brief period of operation for the purposes of using data recorded in the functional object, especially if it is attached to the outside of the sidewall, or when removing the tyre or at the end of its life if the object is on the inside, for analysis purposes or for reuse if required. It is also possible to make the attachment of the object nonremovable once fitted in the tyre. For this purpose, touch-close fasteners with nonreversible fasteners may be used, i.e., those in which the engagement of male elements such as barbs in female elements is irreversible by construction. Another possibility is to use fasteners in which the loops or hooks are made using synthetic threads whose physical properties are modified after attachment. Here, the fastener remains removable until the local application of for example heat sufficient to raise the temperature of the hooks to cause them to retract in such a way that it is no longer possible to disengage them from the loops without destroying the fastener.

The invention is not of course limited to the examples described and illustrated, and various modifications may be made without departing from the scope defined by the accompanying claims.

The invention claimed is:

1. A tyre comprising:
a casing with a wall suitable for containing an internal service pressure, after the casing has been mounted on a vehicle wheel; and
a touch-close fastener for attaching an object to a face of the wall, the fastener including a first part fixed to the wall and able to deform with the wall, and a second part suitable for joining mechanically to the first part by connection elements when the second part is placed against the first part in such a way as to hold the object in a service position on the wall, wherein:
the first part of the fastener has a property of inherent deformability such that stresses developed in the fastener in reaction to deformations of the wall of the casing at an interface with the fastener are substantially less than stresses producing the deformations in the wall,
presence of the first part of the fastener does not significantly hinder the deformations of the wall,
in a joined position the connection elements allow a mechanical looseness between the first and second parts that limits transmission of stress to the second part of the fastener and to the object in the service position,
the first part of the fastener includes a thin backing fixed to the wall of the casing and having a structural elongation capacity greater than or equal to a maximum amplitude of a deformation of the wall of the casing to which the fastener is fixed when subjected to applied stresses,
the thin backing includes a stretchable substrate, and connection elements fixed to the substrate project out from one face of the substrate,
the thin backing includes at least one of:
a ply of woven or nonwoven elongate elastic elements,
a ply of deformable meshes of elongate elements, and
a chainmail ply, and
the substrate has an edge whose thickness decreases up to where the substrate joins the wall of the casing.

2. A tyre according to claim 1, wherein the object is fixed to the second part of the fastener.

3. A tyre according to either of claims 1 and 2, wherein the connection elements include thread elements or flexible pins that in the joined position connect a face of the first part to a corresponding face of the second part of the fastener and have at least one physical or geometrical characteristic that provides the looseness, tangentially and/or radially, between the faces.

4. A tyre according to claim 3, wherein the looseness is provided by adjustment of a length of the connection elements.

5. A tyre according to claim 3, wherein the second part of the fastener includes connection-elements suitable for latching onto corresponding connection elements on a thin backing forming the first part of the connector when corresponding faces of the first and second parts are brought together.

6. A tyre according to claim 5, wherein the connection elements include male coupling elements projecting from a surface of one of the first and second parts and female coupling elements in a corresponding face of another of the first and second parts.

7. A tyre according to claim 1, wherein the structural elongation capacity of the thin backing in a dimension corresponding to a main direction of deformation of the wall of the casing in a sector of the fastener is greater than or equal to 10%.

8. A tyre according to claim 7, wherein the structural elongation capacity of the thin backing in the dimension corresponding to the main direction of deformation of the wall of the casing in the sector of the fastener is greater than or equal to 30%.

9. A tyre according claim 1, wherein the tyre is produced by a manufacturing process that includes one or more stages of shaping a green tyre prior to curing, and wherein the thin backing has an initial structural elongation capacity at a start of manufacture of at least 20% and up to 100% to reproduce deformations of the wall of the casing during the shaping.

10. A tyre according to claim 1, wherein a modulus of elasticity of the thin backing of the fastener in a main direction of deformation of the casing is less than 3.5 MPa at room temperature and 2.5 MPa at 60° C.

11. A tyre according to claim 1, wherein the connection elements include loops of adjustable length and/or inclination protruding from a radially inner surface of the thin backing.

12. A tyre according to claim 1, wherein the connection elements include receptacles formed in a radially inner surface of the thin backing.

13. A tyre according to claim 1, wherein a border region of the substrate has no connection elements.

14. A tyre comprising:
- a casing with a wall suitable for containing an internal service pressure, after the casing has been mounted on a vehicle wheel; and
- a touch-close fastener for attaching an object to a face of the wall, the fastener including a first part fixed to the wall and able to deform with the wall, and a second part suitable for joining mechanically to the first part by connection elements when the second part is placed against the first part in such a way as to hold the object in a service position on the wall, wherein the first part of the fastener has a property of inherent deformability such that stresses developed in the fastener in reaction to deformations of the wall of the casing at an interface with the fastener are substantially less than stresses producing the deformations in the wall, wherein presence of the first part of the fastener does not significantly hinder the deformations of the wall, wherein the first part of the fastener includes a thin backing fixed to the wall of the casing, the thin backing including at least one of:
- a ply of woven or nonwoven elongate elastic elements,
- a ply of deformable meshes of elongate elements, and
- a chainmail ply, wherein in a joined position the connection elements allow a mechanical looseness between the first and second parts that limits transmission of stress to the second part of the fastener and to the object in the service position, and wherein the second part of the fastener includes a plate of a material that is essentially nondeformable parallel to the wall of the casing that has one face provided with connection elements and that is fixed to the object to be attached via another face.

15. A tyre according to claim 14, wherein the plate is moulded with the object.

* * * * *